(12) United States Patent
Jung

(10) Patent No.: US 7,586,360 B2
(45) Date of Patent: Sep. 8, 2009

(54) POWER SUPPLY APPARATUS AND METHOD

(75) Inventor: Bu-Il Jung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 113 days.

(21) Appl. No.: 11/708,353

(22) Filed: Feb. 21, 2007

(65) Prior Publication Data
US 2007/0200612 A1    Aug. 30, 2007

(30) Foreign Application Priority Data
Feb. 24, 2006    (KR) ............... 10-2006-0018420

(51) Int. Cl.
*G05F 1/10* (2006.01)
(52) U.S. Cl. .................. 327/536; 327/512
(58) Field of Classification Search ............. 327/512, 327/513, 535, 536, 537
See application file for complete search history.

(56) References Cited

U.S. PATENT DOCUMENTS

| | | | |
|---|---|---|---|
| 5,881,014 A * | 3/1999 | Ooishi | 365/226 |
| 6,084,800 A * | 7/2000 | Choi et al. | 365/185.23 |
| 6,424,203 B1 * | 7/2002 | Bayadroun | 327/536 |
| 6,459,328 B1 * | 10/2002 | Sato | 327/536 |
| 6,466,079 B1 * | 10/2002 | Kushnarenko | 327/536 |
| 6,664,846 B1 * | 12/2003 | Maung et al. | 327/536 |
| 7,304,871 B2 * | 12/2007 | Ito et al. | 363/59 |
| 7,466,187 B2 * | 12/2008 | Kawagoshi | 327/536 |

FOREIGN PATENT DOCUMENTS

| | | |
|---|---|---|
| JP | 07-028531 | 1/1995 |
| JP | 07-221261 | 8/1995 |
| KR | 1020050082579 A | 8/2005 |
| KR | 1020050082585 A | 8/2005 |

* cited by examiner

*Primary Examiner*—Jeffrey S Zweizig
(74) *Attorney, Agent, or Firm*—Harness, Dickey & Pierce, P.L.C.

(57) ABSTRACT

The apparatus may include a non-pumping power supply unit configured to generate a supply voltage from a power source voltage and/or configured to output the supply voltage. The apparatus may include a pumping power supply unit and/or a control circuit. The pumping power supply unit may be configured to generate a pump voltage based on the power source voltage and/or configured to output the pump voltage. The control circuit may boost the supply voltage with the pump voltage after a level of the supply voltage reaches the first target voltage level.

28 Claims, 5 Drawing Sheets

POWER SUPPLY APPARATUS AND METHOD

PRIORITY STATEMENT

This application claims the benefit of priority to Korean Patent Application No. 10-2006-0018420, filed on Feb. 24, 2006, in the Korean Intellectual Property Office, the entire contents of which are incorporated herein in their entirety by reference.

BACKGROUND

1. Field

Example embodiments relate to a power supply apparatus and/or method, and for example, to a power supply apparatus for a temperature sensor and/or a power supply method for a temperature sensor.

2. Description of Related Art

A semiconductor device may sense temperature and/or operate differently depending on sensed temperatures. Power may be supplied to a temperature sensor for sensing the temperature only during the time when temperature is sensed, in order to reduce current consumption of the temperature sensor. Each temperature sensor may have its own lower source voltage or VDD margin. For example, when a temperature sensor uses VDD from the outside as a power source voltage, the temperature sensor may have a margin related to the minimum operating voltage. For example, a temperature sensor whose power source voltage (VDD) is 1.7 V may perform a normal operation with a minimum source voltage of 1.6 V, a lower VDD margin of the temperature sensor may be 0.1 V, i.e., the difference between 1.7 V and 1.6 V.

A temperature sensor may include an analog circuit to detect a temperature. However, the analog circuit may have a narrower, lower VDD margin than common digital logic. Accordingly, when a power source voltage (VDD) is sufficiently lower, the temperature sensor need not operate.

SUMMARY

Example embodiments may provide a power supply apparatus and/or method, for example for a temperature sensor, by which a lower power source voltage (VDD) margin, for example a lower power source voltage (VDD) of the temperature sensor, may be widened.

According to an example embodiment, a power supply apparatus may include a non-pumping power supply unit, a pumping power supply unit, and/or a control circuit. The non-pumping power supply unit may be configured to generate a supply voltage from a power source voltage and configured to output the supply voltage. The pumping power supply unit may be configured to generate a pump voltage based on the power source voltage and configured to output the pump voltage. The control circuit may be configured to boost the supply voltage with the pump voltage.

According to an example embodiment, the power supply apparatus may further include a temperature sensor. The non-pumping power supply unit may output the supply voltage to the temperature sensor. The boosted supply voltage may be supplied to the temperature sensor.

According to an example embodiment, a method of controlling a power supply may include generating a supply voltage from a power source voltage, outputting the supply voltage, generating a pump voltage based on the power source voltage, and/or boosting the supply voltage with the pump voltage after the level of the supply voltage reaches a first target voltage level.

According to an example embodiment a power supply apparatus for a temperature sensor may include a power supply unit that need not use charge pumping (hereinafter, non-pumping power supply unit), which includes a metal oxide semiconductor (MOS) switch having an output terminal connected to the temperature sensor, wherein the non-pumping power supply unit may boost a power source voltage from an operation starting time of the temperature sensor to the time a level of an output voltage of the non-pumping power supply unit reaches a first target voltage level, and/or output the boosted voltage to the temperature sensor; a pumping power supply unit boosting the power source voltage using charge pumping and/or outputting the boosted voltage; and/or a controller supplying the voltage output from the pumping power supply unit to the temperature sensor after the level of the output voltage of the non-pumping power supply unit reaches the first target voltage level.

According to an example embodiment, if the boosted voltage is supplied to the temperature sensor, by implementing a phased power up control in which a first stage of voltage boosting may be performed using the non-pumping power supply unit and/or a second stage of voltage boosting may be performed to a desired target level using the pumping power supply unit, current consumption may be reduced, and/or a load of the power supply apparatus for a temperature sensor may be reduced.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1:
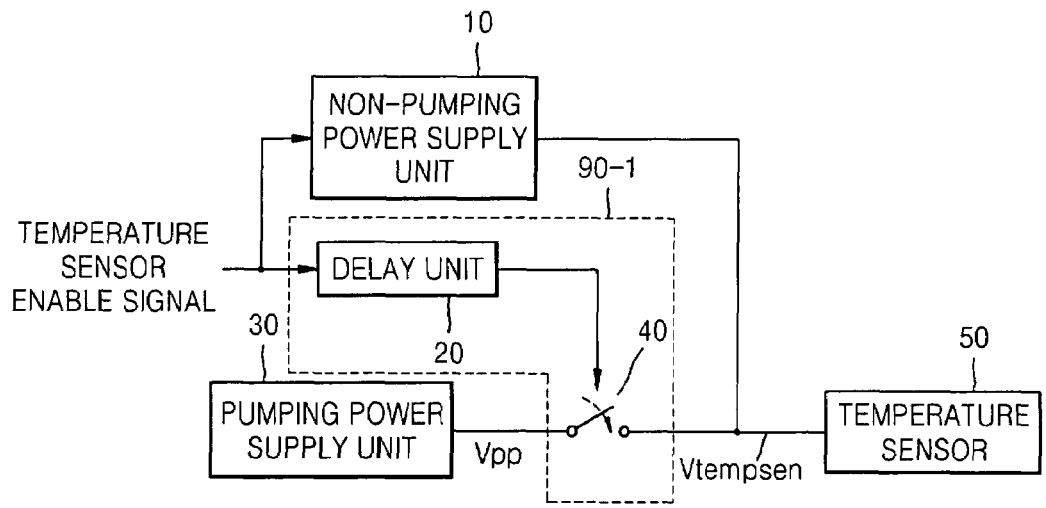
FIG. 1 is a block diagram of a power supply apparatus for a temperature sensor, according to an example embodiment.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

Example embodiments, while described below as a power supply apparatus for a temperature sensor, are not limited thereto and example embodiments may be embodied as a power supply apparatus and/or method for any number of devices and/or circuits (for example, circuits implementing analog circuitry and/or common digital logic).

FIG. 1 is a block diagram of a power supply apparatus for a temperature sensor, according to an example embodiment. Referring to FIG. 1, the power supply apparatus may include a non-pumping power supply unit 10, a delay unit 20, and/or a pumping power supply unit 30. The delay unit 20 may receive a temperature sensor enable signal. An output terminal of the non-pumping power supply unit 10 may be connected to an input terminal of a temperature sensor 50. An output terminal of the pumping power supply unit 30 may be connected to the input terminal of the temperature sensor 50 via a switch 40. An on/off operation of the switch 40 may be controlled by the delay unit 20. As shown by the dashed lines in FIG. 1, the delay unit 20 and/or the switch 40 may constitute a control circuit 90-1.

The temperature sensor 50 may sense a temperature change at intervals of a desired or, alternatively, a predetermined period of time so that a semiconductor device using the temperature sensor 50 may update a control of the semiconductor device etc., in accordance with the sensed temperature change. Accordingly, because the temperature sensor 50 need not be continuously operated, a method of supplying power to the temperature sensor 50 only during a temperature sensing time may be used in order to reduce current consumption. The temperature sensor enable signal may be a signal enabling the operation of the temperature sensor 50.

Figure 2:
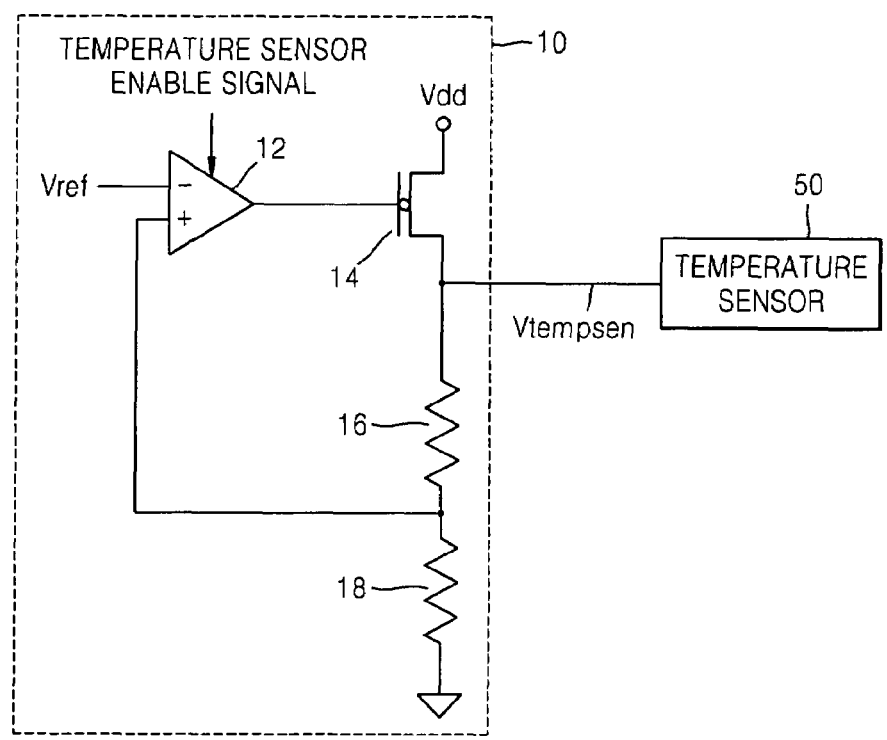
FIG. 2 illustrates an internal structure of a non-pumping power supply unit illustrated in FIG. 1, according to an example embodiment.

FIG. 2 illustrates an internal structure of the non-pumping power supply unit 10 illustrated in FIG. 1, according to an example embodiment. Referring to FIG. 2, the non-pumping power supply unit 10 may include a differential amplifier 12, a positive channel MOS (PMOS) transistor 14, and/or resistors 16 and/or 18. Operation of the differential amplifier 12 may be enabled by the temperature sensor enable signal.

A source of the PMOS transistor 14 may be connected to a power source voltage Vdd. A control terminal (gate) of the PMOS transistor 14 may be connected to an output terminal of the differential amplifier 12. A drain of the PMOS transistor 14 may be connected to the temperature sensor 50 and the resistor 16. A temperature sensor supply voltage Vtempsen output from the non-pumping power supply unit 10 having this structure may be used as a driving voltage of the temperature sensor 50.

The differential amplifier 12 may receive a desired or, alternatively, a predetermined reference voltage Vref through its inverting input terminal and/or receive a voltage divided by the resistors 16 and 18 through its non-inverting input terminal. If the temperature sensor enable signal is input to a control terminal of the differential amplifier 12, the differential amplifier 12 may compare the divided voltage to the desired or, alternatively, the predetermined reference voltage Vref, and an on/off operation of the PMOS transistor 14 may be controlled according to a comparison result output from the differential amplifier 12.

Figure 3:
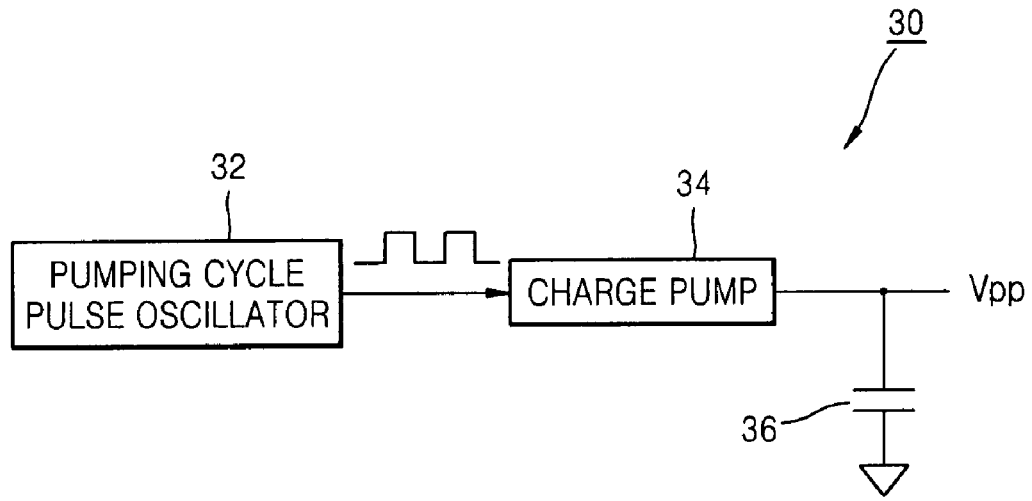
FIG. 3 illustrates an internal structure of a pumping power supply unit illustrated in FIG. 1, according to an example embodiment.

FIG. 3 illustrates an internal structure of the pumping power supply unit 30 illustrated in FIG. 1, according to an example embodiment. Referring to FIG. 3, the pumping power supply unit 30 may include a pumping cycle pulse oscillator 32, a charge pump 34, and/or a power capacitor 36. The pumping cycle pulse oscillator 32 may generate a pulse signal for controlling voltage boosting. The charge pump 34 may perform a charge pumping operation based on the pulse signal.

Figure 4:
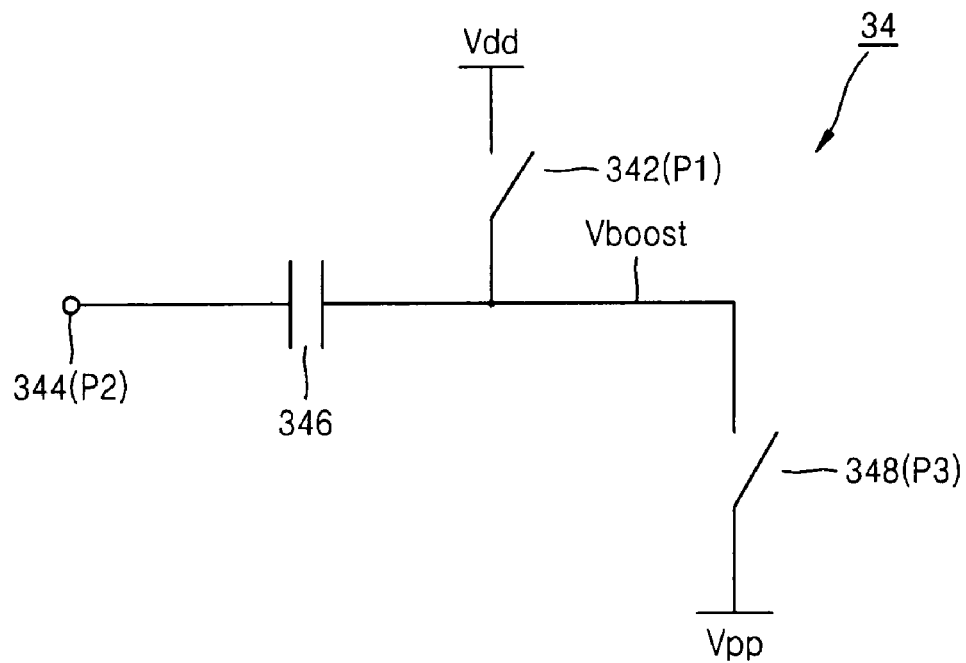
FIG. 4 illustrates an internal structure of a charge pump illustrated in FIG. 3, according to an example embodiment.

FIG. 4 illustrates an internal structure of the charge pump 34 illustrated in FIG. 3, according to an example embodiment. Referring to FIG. 4, the charge pump 34 may include switches 342 and/or 348, an input terminal 344, and/or a capacitor 346. The switch 342 may be connected between the power source voltage Vdd and a first terminal of the capacitor 346. The input terminal 344 may be connected to a second terminal of the capacitor 346, and the first terminal of the capacitor 346 may be connected the switch 348 connected to an output terminal of the pumping cycle pulse oscillator 32 as illustrated in FIG. 3.

Figure 5:
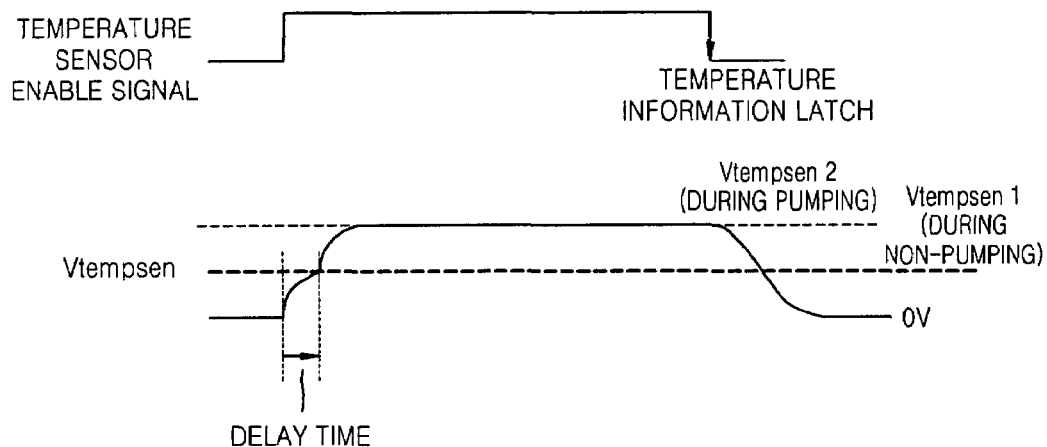
FIG. 5 is an example timing diagram for explaining an operation of the power supply apparatus illustrated in FIG. 1, according to an example embodiment.
Figure 6:
FIG. 6 is an example timing diagram for explaining an operation of the charge pump illustrated in FIG. 4, according to an example embodiment.

FIG. 5 is an example timing diagram for explaining a general operation of the power supply apparatus illustrated in FIG. 1, according to an example embodiment. FIG. 6 is an example timing diagram for explaining an operation of the charge pump 34 illustrated in FIG. 4, according to an example embodiment.

Referring to FIGS. 5 and 6, while the temperature sensor enable signal may enable the operation of the temperature sensor 50, the non-pumping power supply unit 10 may generate a temperature sensor supply voltage Vtempsen from the power source voltage Vdd and/or output the temperature sensor supply voltage Vtempsen. However, the voltage generated by the non-pumping power supply unit 10 may not be higher than the power source voltage Vdd. The delay unit 20, which may receive the same temperature sensor enable signal, may delay the temperature sensor enable signal for a desired or, alternatively a predetermined period of time, and after the desired or, alternatively, the predetermined period of time elapses, the delay unit 20 may turn the switch 40 on. The desired or, alternatively, the predetermined period of time may be from an operation starting time of the temperature sensor 50 to the time the level of the temperature sensor supply voltage Vtempsen may reach a first target voltage level (for example, Vtempsen1 of FIG. 5). Accordingly, during the desired or, alternatively, the predetermined period of time, only the non-pumping power supply unit 10 may generate the temperature sensor supply voltage Vtempsen applied to the temperature sensor 50 from 0 V to the first target voltage level Vtempsen1.

If the delay unit 20 turns the switch 40 on after the desired or, alternatively the predetermined period of time elapses, a pump voltage Vpp generated by the pumping power supply unit 30 may be applied to the temperature sensor 50 via the switch 40. For example, the pumping cycle pulse oscillator 32 included in the pumping power supply unit 30 may generate a pulse signal (for example, p2 of FIG. 6(*b*)) having a constant pulse width, and the pulse signal p2 may be applied to the input terminal 344 of the charge pump 34. In the charge pump 34 illustrated in FIG. 4, the switch 342 connected to the power source voltage Vdd may be turned on/off by a switching control signal (for example, p1 of FIG. 6(*a*)), and the switch 348 may be controlled by a switching control signal (for example, p3 of FIG. 6(*c*)). Accordingly, a boosting voltage Vboost at a connection point between the capacitor 346, the switch 342, and/or the switch 348 may have a waveform of FIG. 6(*d*), and/or the pump voltage Vpp of FIG. 6(*e*) may be output from an output terminal of the charge pump 34.

Accordingly, the temperature sensor supply voltage Vtempsen applied to the temperature sensor 50 may be boosted to a second target voltage level Vtempsen2 by the pump voltage Vpp output from the pumping power supply unit 30. After the temperature sensor supply voltage Vtempsen applied to the temperature sensor 50 is boosted to a second target voltage level Vtempsen2 by the pump voltage Vpp output from the pumping power supply unit 30 and the temperature sensor enable signal drops to a lower level, the temperature sensor 50 may latch temperature information.

In an example embodiment, the pumping power supply unit 30 may be shared with any circuit besides the components illustrated in FIG. 1.

Figure 7:
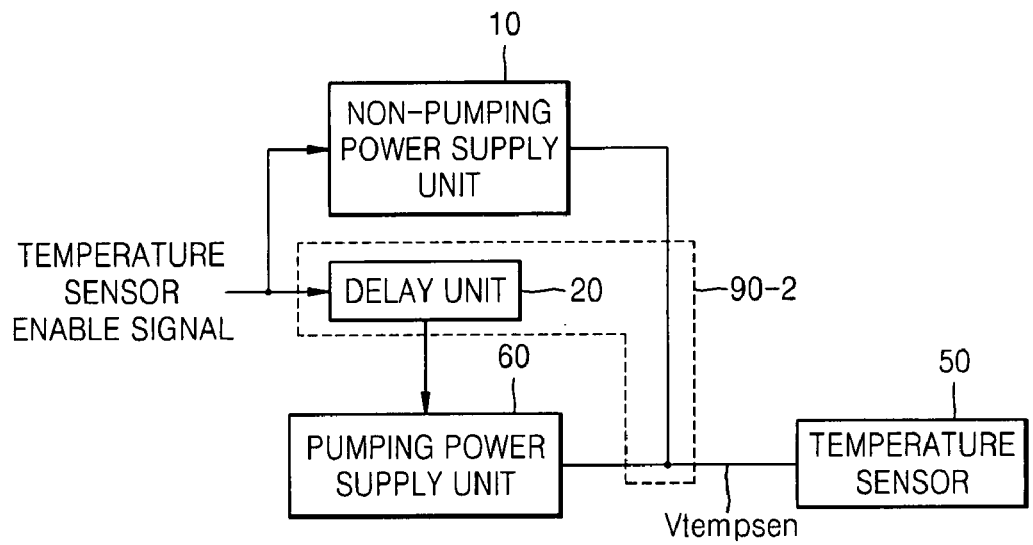
FIG. 7 is a block diagram of a power supply apparatus according to another example embodiment.
Figure 8:
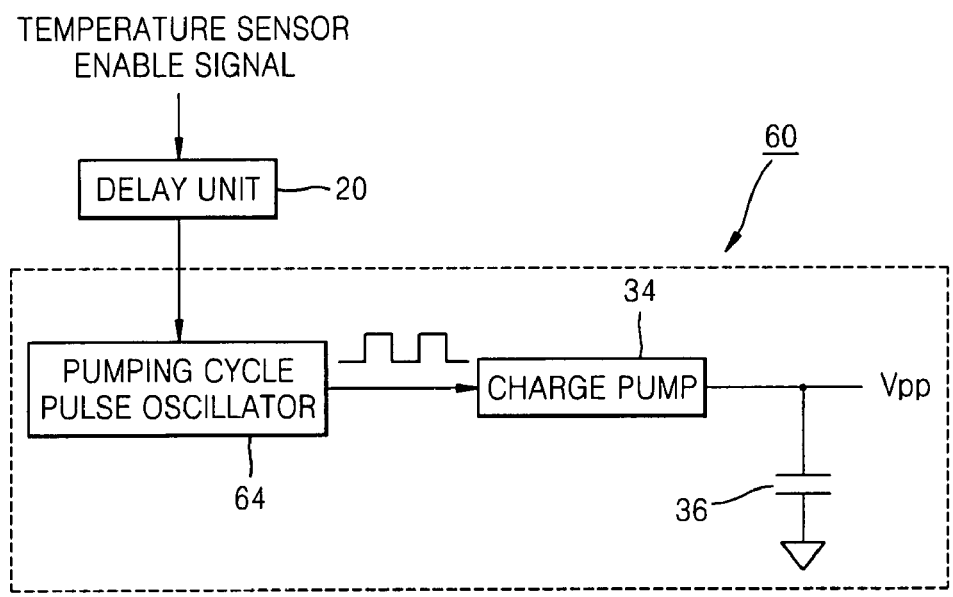
FIG. 8 illustrates an internal structure of a pumping power supply unit illustrated in FIG. 7, according to another example embodiment.

FIG. 7 is a block diagram of a power supply apparatus according to another example embodiment. Referring to FIG. 7, the power supply apparatus may include a non-pumping power supply unit 10 and/or a delay unit 20. The components 10 and/or 20 may be the same as those described above in regards to FIG. 1, and thus, a detailed description of their internal structures is omitted. The temperature sensor 50 may also be the same as that illustrated in FIG. 1. A pumping power supply unit 60 included in the power supply apparatus of FIG. 7, may have a different internal structure than the pumping power supply unit 30. FIG. 8 illustrates the pumping power supply unit 60. As shown the pumping power supply unit 60 may have the same configuration as the pumping power supply unit 30 illustrated in FIG. 3 except for a pumping cycle pulse oscillator 64, which may be enabled by an enable signal applied by the delay unit 20. Namely, the pumping cycle pulse oscillator 64 of FIG. 8 replaces the pumping cycle pulse oscillator 32 of FIG. 3. As shown by the dashed lines in FIG. 7, the delay unit 20 may constitute a control circuit 90-2.

Unlike the power supply apparatus of FIG. 1 including the pumping power supply unit 30, which may be shared with another circuit, in the power supply apparatus of another example embodiment, the pumping power supply unit 60 may be activated based on the temperature sensor enable signal. Accordingly, the pumping power supply unit 60 may not operate until the temperature sensor supply voltage Vtempsen generated by the non-pumping power supply unit 10 is the first target voltage level Vtempsen1.

Figure 9:
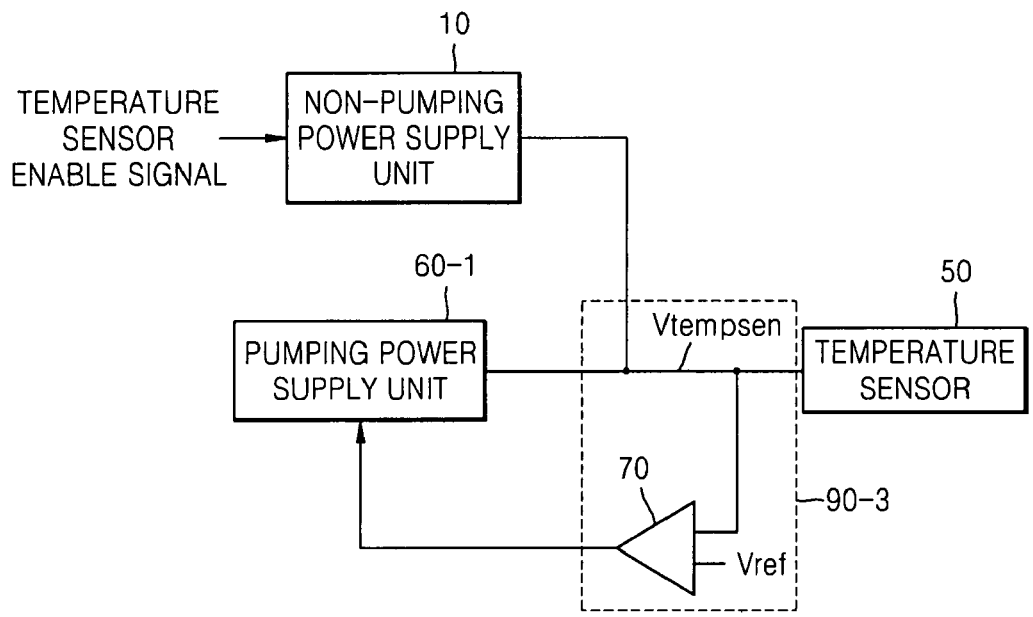
FIG. 9 is a block diagram of a power supply apparatus according to another example embodiment.

FIG. 9 is a block diagram of a power supply apparatus according to another example embodiment. Referring to FIG. 9, the power supply apparatus may include the non-pumping power supply unit 10, a pumping power supply unit 60-1, and/or a comparator 70. The non-pumping power supply unit 10 may have the same configuration as that illustrated in FIG. 1. The pumping power supply unit 60-1 may be the same as the pumping power supply unit 60 illustrated in FIG. 7 except that the pumping power supply unit 60-1 may be enabled by an output signal of the comparator 70. The comparator 70 may compare a level of the temperature sensor supply voltage Vtempsen generated by the non-pumping power supply unit 10 to a desired or, alternatively, a predetermined reference voltage Vref. If the level of the temperature sensor supply voltage Vtempsen is greater than the desired or, alternatively, the predetermined reference voltage Vref, the comparator 70 may enable the pumping power supply unit 60-1. The desired or, alternatively, the predetermined reference voltage Vref may be the same as the first target voltage level Vtempsen1 illustrated in an above example embodiment. As shown by the dashed lines in FIG. 9, the comparator 70 may constitute a control circuit 90-3.

In the power supply apparatus of another example embodiment the comparator 70 may compare voltage levels to obtain a comparison result, which may be used to determine whether to enable a boosting operation of the pumping power supply unit 60-1. Accordingly, even though a desired or, alternatively, a predetermined period of time from a starting time of the non-pumping power supply unit 10 to an starting time of the pumping power supply unit 60-1 may vary due to changes in a surrounding environment, there may be an advantage in that the power supply apparatus of this example embodiment may correctly determine the enabling time of the pumping power supply unit 60-1.

Figure 10:
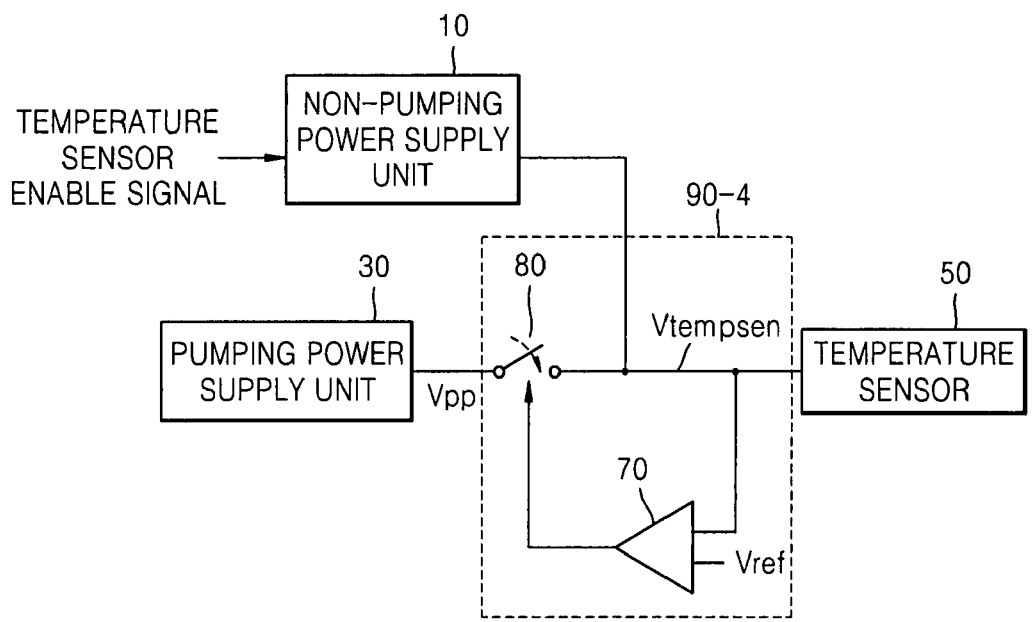
FIG. 10 is a block diagram of a power supply apparatus according to another example embodiment.

FIG. 10 is a block diagram of a power supply apparatus according to another example embodiment. Referring to FIG. 10, the power supply apparatus may include the non-pumping power supply unit 10, the pumping power supply unit 30, a comparator 70, and/or a switch 80. The non-pumping power supply unit 10, the pumping power supply unit 30, and/or the comparator 70 may have the same configurations and functions as their counterparts in the previous drawings, which have the same reference numerals. The power supply apparatus illustrated in FIG. 10 may be the same as the power supply apparatus illustrated in FIG. 9 except that an output of the comparator 70 may be used as a control signal of the switch 80. As shown by the dashed lines in FIG. 10, the comparator 70 and the switch 80 may constitute a control circuit 90-4.

The switch 80 may be located between a connection point between an output terminal of the non-pumping power supply unit 10 and the input terminal of the temperature sensor 50 and an output terminal of the pumping power supply unit 30. The comparator 70 may compare the level of the temperature sensor supply voltage Vtempsen generated by the non-pumping power supply unit 10 to a desired or, alternatively, a predetermined reference voltage Vref, and if the level of the temperature sensor supply voltage Vtempsen is greater than the desired or, alternatively, the predetermined reference voltage Vref, the comparator 70 may turn on the switch 80. The desired or, alternatively, the predetermined reference voltage Vref may be the same as the first target voltage level Vtempsen1 illustrated in an above example embodiment.

As described above, according to example embodiments, by generating a voltage applied to a temperature sensor in a first stage using a non-pumping power supply unit having a lower current consumption and boosting the voltage applied to the temperature sensor in a second stage using a pumping power supply unit having a relatively higher current consumption, a power supply apparatus for the temperature sensor may efficiently control current consumption. Because the voltage applied to the temperature sensor may be boosted using the pumping power supply unit, the voltage applied to the temperature sensor may be boosted higher than a power source voltage, and a lower power source voltage margin may be widened. Because the second stage using the pumping power supply unit may be performed based on a result obtained by comparing a level of the voltage generated by the non-pumping power supply unit to a desired or, alternatively, a predetermined reference voltage level, a power supply apparatus that correctly operates regardless of changes in a surrounding environment may be provided.

Although example embodiments have been shown and described in this specification and figures, it would be appreciated by those skilled in the art that changes may be made to the illustrated and/or described example embodiments without departing from their principles and spirit.

What is claimed is:

1. A power supply apparatus comprising:
a non-pumping power supply unit configured to generate a supply voltage from a power source voltage and configured to output the supply voltage;
a pumping power supply unit configured to generate a pump voltage based on the power source voltage and configured to output the pump voltage; and
a control circuit configured to boost the supply voltage with the pump voltage after a level of the supply voltage reaches a first target voltage level.

2. The apparatus of claim 1, wherein the non-pumping power supply unit is configured to increase the supply voltage.

3. The apparatus of claim 1, wherein the non-pumping power supply unit is configured to generate the supply voltage in response to an enable signal.

4. The apparatus of claim 1, wherein the non-pumping power supply unit includes a metal oxide semiconductor (MOS) switch having an output terminal.

5. The apparatus of claim 1, wherein the pumping power supply unit is configured to generate the pump voltage using charge pumping.

6. The apparatus of claim 1, wherein
the pumping power supply unit is configured to generate the pump voltage until a voltage level of the pump voltage reaches a second target voltage level, and the second target voltage level is higher than the first target voltage level.

7. The apparatus of claim 1, wherein the pumping power supply unit comprises:
a pumping cycle pulse oscillator configured to generate a pulse signal for controlling voltage boosting;
a charge pump configured to perform a charge pumping operation based on the pulse signal; and
a power capacitor connected to an output of the charge pump.

8. The apparatus of claim 1, wherein the control circuit comprises:
a switch configured to selectively connect an output of the pumping power supply unit to an output of the non-pumping power supply unit in response to a delayed enable signal; and
a delay unit configured to delay an enable signal by a period of time to generate the delayed enable signal, the period of time being a period of time for the level of the supply voltage to reach the first target voltage level.

9. The apparatus of claim 8, wherein the non-pumping power supply unit is configured to generate the supply voltage in response to the enable signal.

10. The apparatus of claim 1, wherein the control circuit comprises:
a delay unit configured to delay an enable signal by a period of time to generate a delayed enable signal, the period of time being a period of time for the level of the supply voltage to reach the first target voltage level, and
the pumping power supply unit being enabled by the delayed enable signal.

11. The apparatus of claim 1, wherein the control circuit comprises:
a comparator configured to compare a level of the supply voltage to a reference voltage level arid enabling the pumping power supply unit if the supply voltage level is greater than the reference voltage level.

12. The apparatus of claim 11, wherein the reference voltage level is the first target voltage level.

13. The apparatus of claim 1, wherein the control circuit comprises:
a switch configured to selectively connect an output of the pumping power supply unit to an output of the non-pumping power supply unit; and
a comparator configured to compare a level of the supply voltage to a reference voltage level and cause the switch to connect the output of the pumping power supply unit to the output of the non-pumping power supply unit if the supply voltage level is greater than the reference voltage level.

14. The apparatus of claim 13, wherein the reference voltage level is the first target voltage level.

15. The apparatus of claim 1, further comprising:
a temperature sensor, wherein
the non-pumping power supply unit outputs the supply voltage to the temperature sensor, and
the boosted supply voltage is supplied to the temperature sensor.

16. The apparatus of claim 15, wherein the temperature sensor is configured to perform a sensing operation in response a temperature sensor enable signal, and the control circuit is configured to supply power from the non-pumping power supply unit and the pumping power supply unit to the temperature sensor in response to the temperature sensor enable signal.

17. A method of controlling a power supply, the method comprising:

generating a supply voltage from a power source voltage;

outputting the supply voltage;

generating a pump voltage based on the power source voltage; and boosting the supply voltage with the pump voltage after the level of the supply voltage reaches a first target voltage level.

18. The method of claim 17, wherein the generating a supply voltage step increases the supply voltage.

19. The method of claim 17, wherein the generating a supply voltage step generates the supply voltage in response to an enable signal.

20. The method of claim 17, wherein the generating a pump voltage step generates the pump voltage until the pump voltage reaches a second target voltage level, and wherein the second target voltage level is higher than the first target voltage level.

21. The method of claim 17, wherein the generating a pump voltage step generates the pump voltage using charge pumping.

22. The method of claim 17, further comprising:

delaying an enable signal by a period of time for a level of the supply voltage to reach the first target voltage level; and wherein the boosting the supply voltage step boosts the supply voltage by the pump voltage in response to the delayed enable signal.

23. The method of claim 17, further comprising:

delaying an enable signal by a period of time for a level of the supply voltage to reach the first target voltage level; and wherein the generating a pump voltage step generates the pump voltage in response to the delayed enable signal.

24. The method of claim 17, further comprising:

comparing a level of the supply voltage to a reference voltage level; and wherein the generating a pump voltage step generates the pump voltage if the supply voltage is greater than the reference voltage level.

25. The method of claim 24, wherein the reference voltage level is the first target voltage level.

26. The method of claim 17, further comprising:

comparing a level of the supply voltage to a reference voltage level; and wherein the boosting the supply voltage step boosts the supply voltage by the pump voltage if the supply voltage level is greater than the reference voltage level.

27. The method of claim 26, wherein the reference voltage level is the first target voltage level.

28. The method of claim 17, further comprising:

supplying the supply voltage to a temperature sensor; and supplying the boosted supply voltage to the temperature sensor.

* * * * *